US006502483B1

(12) United States Patent
Swank et al.

(10) Patent No.: US 6,502,483 B1
(45) **Date of Patent: *Jan. 7, 2003**

(54) COMBINATION SKATEBOARD TOOL

(75) Inventors: Tod Swank, San Diego, CA (US); Matthew J. Barker, San Diego, CA (US); Joshua Z. Beagle, San Diego, CA (US)

(73) Assignee: Tum Yeto, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/942,538

(22) Filed: Aug. 29, 2001

(51) Int. Cl.[7] ................................................ B25B 23/00

(52) U.S. Cl. ......................... 81/437; 81/177.4; 81/3.09; 7/138

(58) Field of Search ............................. 81/124.2, 124.4, 81/124.3, 124.7, 125.1, 437, 439, 177.4, 3.09; 7/138, 165

(56) References Cited

U.S. PATENT DOCUMENTS

| | | | | |
|---|---|---|---|---|
| 4,774,736 A | * | 10/1988 | Brawner et al. | 81/437 |
| 5,086,674 A | * | 2/1992 | Her | 81/124.4 |
| 6,062,111 A | * | 5/2000 | Wershe | 81/177.4 |
| 6,199,456 B1 | * | 3/2001 | Hlady | 81/125.1 |
| 6,279,434 B1 | * | 8/2001 | Brown | 81/437 |

* cited by examiner

*Primary Examiner*—Eileen P. Morgan
*Assistant Examiner*—Joni B. Danganan
(74) *Attorney, Agent, or Firm*—Pillsbury Winthrop LLP

(57) ABSTRACT

A combination tool includes a first tool part and a second tool part. The first tool part includes a first cylindrical member connected to a handle. The said first cylindrical member has a pair of ends, at least one of which is formed to define at least a partial socket. The handle has a longitudinal bore with an open end. The second tool part includes a first rod that is insertable in the bore of the handle.

21 Claims, 1 Drawing Sheet

COMBINATION SKATEBOARD TOOL

CROSS-REFERENCE TO RELATED APPLICATION

The present application is related to U.S. application Ser. No. 09/454,662, filed Dec. 3, 1999, titled MULTI-SOCKET SKATEBOARD TOOL U.S. Pat. No. 6,295,897.

FIELD OF THE INVENTION

The present invention relates generally to a hand tool that is useful in the adjusting, repairing and/or replacing of parts on skateboards. More specifically, the present invention relates to a skateboard tool having variously-sized sockets, a bottle opener, screwdriver, and hex key.

BACKGROUND OF THE INVENTION

Skateboards are well known and currently used by individuals for purposes of exercise, recreation and competition. Various skateboard designs are known in the art. Traditional skateboards typically comprise a longitudinally elongated platform or deck having on the bottom surface two straight axles positioned transversely across each end of the deck. The axles are mounted to the bottom surface of the platform by a truck. Wheels mounted on the ends of the axles provide a motive base.

There are a variety of commercially available wheels, decks and trucks. In addition to there being a number of truck manufacturers, there are a number of different types and designs of trucks that are used for different skateboarding conditions. For example, there may be a truck type that is particularly adapted to a certain riding mode (e.g., stairs, railings, bowls, spines or pipes) that is unsuitable for other courses or riding modes. This is due in part to the tightness or softness of the truck pivoting assembly, the size of the truck, and the type of wheels. Trucks also generally have a tightness adjustment so that the same truck can be tightened up to require more turning force. Thus, the same trucks can be used to cover a range of skateboarding conditions.

However, despite the fact that trucks are generally adjustable, a competition rider may have several truck sets that he or she will switch on and off of the board during the course of the various events in a typical skateboarding competition. Additionally, the rider typically needs to periodically adjust the tension on the truck, and tighten any nuts or bolts that may loosen during use. Also, in order to keep their boards in good working order, skateboarders must periodically replace worn out parts, such as wheels and wheel beatings, so that their skateboards may continue to function properly.

Nuts and bolts of various sizes are used for adjusting the truck, securing the truck to the board and for securing the wheels onto the ends of the axles. These nuts and bolts often have limited accessibility (i.e., are in tight spaces) and, thus, can be very difficult and cumbersome to loosen or remove using traditional pliers or wrenches. Even dedicated skateboard tools that are currently available are not ideal in this respect.

SUMMARY OF THE INVENTION

The present invention addresses the foregoing needs by providing a skateboard tool comprising a rod on which are mounted two or three variously sized sockets. Preferably, the truck fastener socket of the instant tool is not necessarily aligned with the rod. Rather, the truck fastener socket may be oriented at an appropriate angle, such that the rod extends outward diagonally when the socket is fitted over a truck fastener and is free from significant interference from the above-described lip or overhang. In addition, the skateboard tool optionally includes means for removing a bottle cap (e.g., a cut-away portion useful as a bottle opener).

Furthermore, the tool includes storage capability for another, smaller tool. A hollow inner portion in the rod and an indentation in one of the sockets allows an L-shaped rod to be stored within the skateboard tool. The L-shaped rod may have a screwdriver at one end and a hex key at the other end. The L-shaped rod also has an o-ring around a portion of it, which allows the L-shaped rod to fit snugly within the rest of the skateboard tool.

The third socket is preferably hexagonal and approximately 3/8", so as to be useful as a truck fastener socket. In a preferred embodiment, the first, second and third sockets have different sizes. In one embodiment, the three sockets are hexagonal and the size of the third socket is approximately 3/8" and the sizes of the first and second sockets are, in either order, approximately 1/2" and approximately 9/16".

The tool preferably comprises a metal or a metal alloy, such as a steel or steel alloy. The tool may be one-piece (i.e., integral), such as where the tool is cast metal or metal alloy. Alternatively, the tool may be made up of two or more parts that are welded or braised, or otherwise bonded,fitted or attached together. For example, in certain embodiments, one or more of the first, second or third socket heads can be mounted to the rod by welding.

DESCRIPTION OF THE PREFERRED EMBODIMENT

Figure 1:
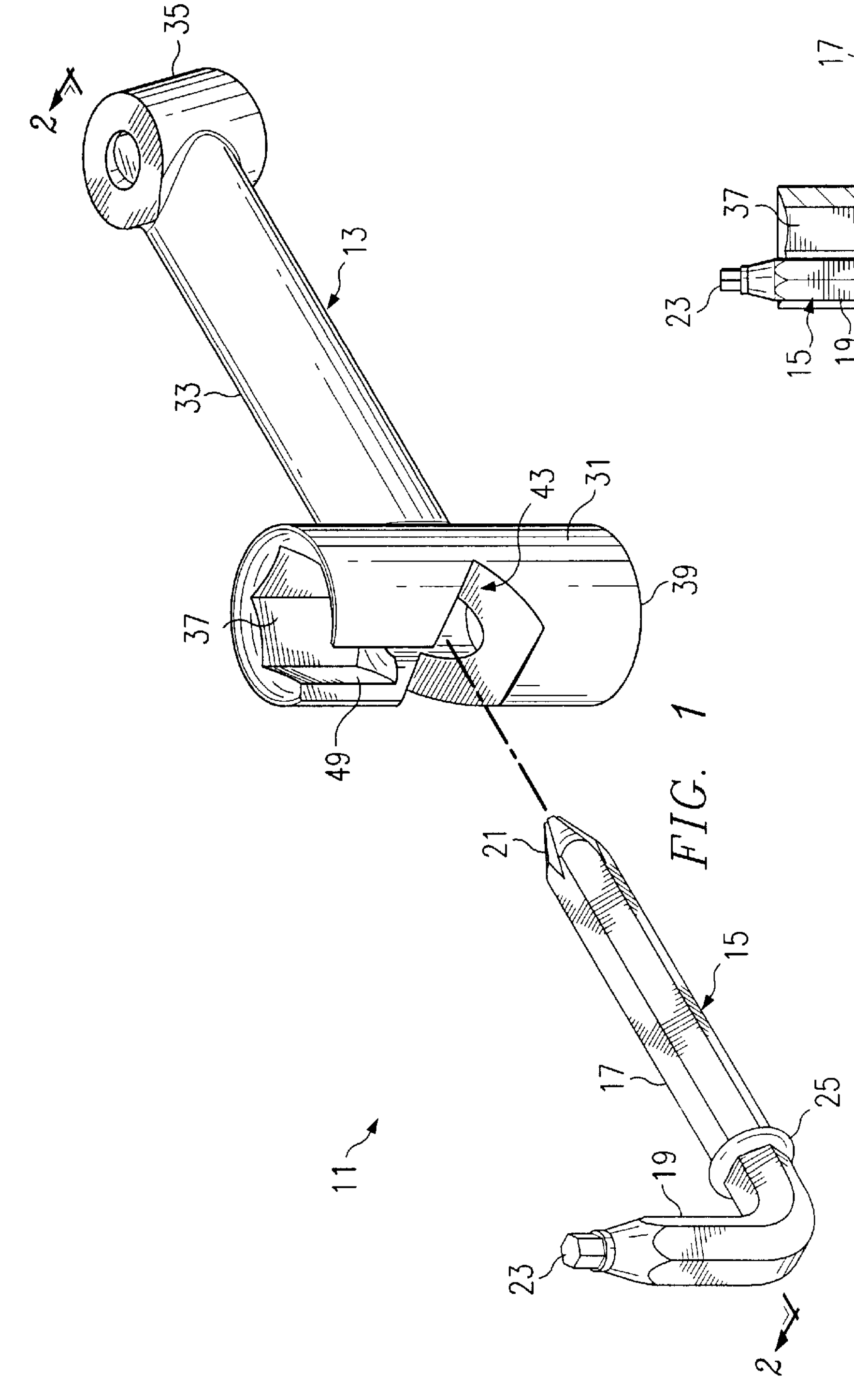
FIG. 1 is an exploded perspective view of a preferred embodiment of a skateboard tool of the present invention, showing an L-shaped tool separated from a socket tool according to the present invention.

Referring to the drawings, a skateboard tool according to the present invention is designated generally by the numeral 11. Skateboard tool 11 includes a combination socket wrench and bottle cap opener 13 and an L-shaped key tool 15.

Figure 2:
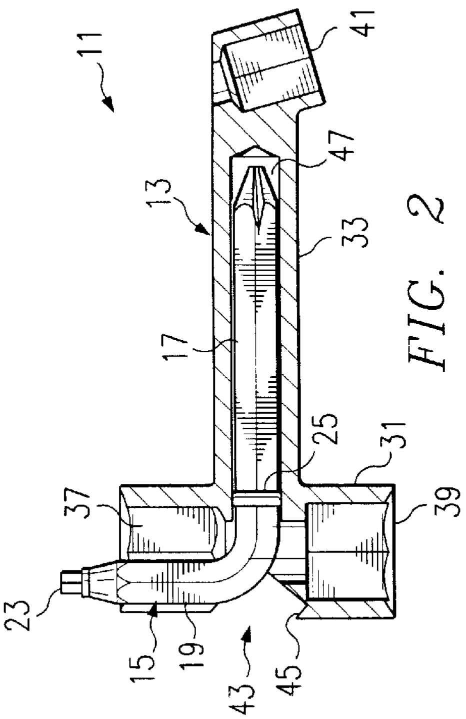
FIG. 2 is a sectional view taken generally along line 2—2 of FIG. 1, showing the L-shaped tool inserted. into the socket tool according to the present invention.

Key tool 15 is preferably formed of bent hexagonal bar stock and it includes a first leg 17 and a second leg 19. The end of first leg 17 is formed to define a Philips head screw drive 21. The end of second leg 19 is formed to define a hexagonal Allen drive 23. First, leg 17 forms a lever arm for applying torque to Allen drive 23. Similarly, second leg 19 forms a lever arm for applying torque to Philips head screw drive 21. First leg 17 includes a circular groove which contains an O ring 25. As indicated in FIG. 1 and as shown in FIG. 2, key tool 15 is insertable into socket tool 13. As will be apparent to those skilled in the art, other tools, such as flat blade and Torx™ drives, may be substituted for drives 21 and 23.

Socket tool 13 includes a first cylinder 31 connected to a handle 33. A second cylinder 35 is connected to handle 33 opposite first cylinder 31. First cylinder 31 has ends that are formed to define a first socket 37 and a second socket 39. Sockets 37 and 39 are preferably hexagonal in shape and they are sized to fit common skateboard nuts, such as 1/2" and 9/16" nuts. One end of second cylinder 35 is formed to define a third socket 41, which is sized to fit a common skateboard nut, such as a ⅜" nut. Preferably, the angle between the handle 33 and cylinder 35 is between 90 degrees and about 135 degrees. This range of angles permits the third socket head 41 to access a truck fastener without significant interference with lips or overhangs found on many contemporary skateboard truck designs. More preferably the angle is about 95 degrees and 110 degrees, and, most preferably, between about 100 degrees and about 105 degrees.

According to the present invention, a bottle cap opener 43 is formed in cylinder 41 between sockets 37 and 39. As best shown in FIG. 2, bottle cap opener 43 includes a V-shaped notch and a hook portion 45. Hook portion 45 is adapted to engage the lower end of bottle cap when key tool 15 is removed. The bottle cap is moved by lifting handle 33.

As best shown in FIG. 2, handle 33 includes an elongated bore 47 that is adapted to contain first leg 17 of key 15. As best shown in FIG. 1, cylinder 31 includes an elongated slot 49 for containing second leg 19 of key 15 when first leg 17 is inserted into bore 47. As shown in FIG. 2, O-ring 25 forms an interference fit with bore 47.

As shown in FIG. 2, leg 17 stays snugly contained within bore 47 and leg 19 is contained within slot 49 of cylinder 31. Thus tool 11 according to the present invention provides five skateboard tools and a bottle cap opener in one neat compact arrangement. In use, key 15 may be removed so that drives 21 and 23 may be used. Sockets 37, 39, and 41 may be used to loosen or tighten nuts or bolts of various sizes. Finally, bottle cap opener 43 may be used to open bottles.

The specific socket head sizes and drive types described are, of course, merely provided for example. Other appropriate socket sizes and drive types may be used within the scope of the present invention. The skilled artisan will be able to determine which socket sizes and drive types are desired by skateboard users depending on the most common nut and bolt sizes used on commercially available skateboards. The socket and drive sizes may be standardized to either English or Metric dimensions, as appropriate. Also, while the preferred embodiment illustrated in the drawings includes hexagonal sockets, other socket shapes patterns and configurations (including, for example, star patterns) can be used in accordance with the present invention. The skateboard tool of the present invention can be conveniently carried with the skater while he or she skateboards, since the tool is compact and generally flat. This allows the skater the freedom to do repairs on the spot, as well as to adjust the truck assembly and to change wheels or wheel bearings at any desired time. Also, as will be apparent to those skilled in the art, the use as a skateboard to is preferred, but the tool may be used in other environments to tighten or loosen nuts, bolts, screws, and the like.

Although the present invention has thus been described in detail with regard to certain preferred embodiments, it should be apparent to those skilled in the art that various adaptations and modifications of the present invention maybe accomplished without departing from the spirit and the scope of the invention. Accordingly, the present invention is not limited to the specific embodiments illustrated herein. Those skilled in the art will understand that the detailed description as set forth above is not intended to limit the breadth of the present invention, which is instead defined by the appended claims and their appropriately construed legal equivalents.

What is claimed is:

1. A combination tool, which comprises:

a first tool part, said first tool part including:

a first cylindrical member, said first cylindrical member having a pair of ends, at least one of said ends being formed to define at least a partial socket, said first cylindrical member having formed therein between said ends a bottle cap opener; and, a handle having a pair of ends, one of said ends being connected to said first cylindrical member between the ends of said first cylindrical member, said handle having formed therein a bore having an open end; and, a second tool part, said second tool part including a first rod insertable in said bore of said handle of said first tool part, said first rod having a first tool at an end thereof.

2. The tool as claimed in claim 1, including means for retaining said first rod of said second tool part in said bore of said handle.

3. The tool as claimed in claim 2, wherein said means for retaining said first rod of said second tool part in said bore of said handle includes an o-ring positioned between said bore and said first rod and sized to form an interference fit between said first rod and said bore when said first rod is inserted into said bore;

a second tool part, said second tool part including a first rod insertable in said bore of said handle of said first tool part, said first rod having a first tool at an end thereof.

4. The tool as claimed in claim 1, wherein said first cylindrical member is connected to said handle at said open end of said bore, and said first cylindrical member has an opening for insertion of said first rod of said second tool part therethrough.

5. The tool as claimed in claim 4, wherein said opening of said first cylindrical member intersects an end of said handle.

6. The tool as claimed in claim 5, wherein said second tool part includes a second rod extending substantially perpendicular to said first rod, and said opening of said first cylindrical member is adapted to contain said second rod when said first rod is inserted in said bore of said handle.

7. The tool as claimed in claim 6, wherein said second rod has a tool at an end thereof.

8. The tool as claimed in claim 1, wherein both ends of said first cylindrical member are formed to define at least partial sockets.

9. The tool as claimed in claim 1, including a second cylindrical member connected to the other end of said handle, said second cylindrical member having an end formed to define an at least partial socket.

10. A multipurpose combination skateboard tool, which comprises:

a first cylinder having a pair of ends, one of said ends being formed to define a first socket tool and the other of said ends being formed to define a second socket tool, said first cylinder having formed therein a longitudinally extending slot and an opening extending through said cylinder, said first cylinder having formed therein between said ends a bottle cap opener;

an elongated handle having a pair of ends, said handle having a bore extending inwardly from one of said ends, and one end of said handle being attached to said first cylinder such that said bore is accessible through said slot and said opening; and, a second cylinder attached to the other end of said handle, said second cylinder having a pair of ends, one of said ends being formed to define a third socket tool.

11. The tool as claimed in claim 10, including:

a generally L-shaped tool member having a first leg and a second leg, said first leg being insertable into said bore and said second leg being contained in said slot when said first leg is inserted in said bore.

12. The tool as claimed in claim 11, including means for retaining said first leg in said bore.

13. The tool as claimed in claim 12, wherein said retaining means includes an o-ring positioned between said bore and said first leg when said first leg is inserted in said bore.

14. The tool as claimed in claim 11, including a first tool defined at an end of said first leg and a second tool defined at an end of said second leg.

15. A multipurpose combination skateboard tool, which comprises:

a first cylinder having a pair of ends, one of said ends being formed to define a first socket tool and the other of said ends being formed to define a second socket tool, said first cylinder having formed therein a longitudinally extending slot and an opening extending through said cylinder, said first cylinder having formed therein between said ends a bottle cap opener;

an elongated handle having a first end and a second end, said first end of said handle being attached to said first cylinder; and, a second cylinder connected to the second end of said handle, said second cylinder having a pair of ends, one of said ends being formed to define a third socket tool.

16. The tool as claimed in claim 15, including:

a generally L-shaped tool member having a first leg and a second leg, said first leg being insertable into through said opening and said second leg being contained in said slot when said first leg is inserted through said opening.

17. The tool as claimed in claim 16, wherein:

said handle includes a bore extending inwardly from said first end; and, said handle is connected to said first cylinder such that said bore is aligned with said opening, whereby said first leg is insertable into said bore.

18. The tool as claimed in claim 17, including means for retaining said first leg in said bore.

19. The tool as claimed in claim 18, wherein said retaining means includes an o-ring positioned between said bore and said first leg when said first leg is inserted in said bore.

20. The tool as claimed in claim 16, including a first tool defined at an end of said first leg and a second tool defined at an end of said second leg.

21. The tool as claimed in claim 15, wherein said a second cylinder is fixedly connected to the second end of said handle.

* * * * *